(12) United States Patent
Hedtke

(10) Patent No.: US 7,290,452 B2
(45) Date of Patent: Nov. 6, 2007

(54) REMOTE PROCESS SEAL WITH IMPROVED STABILITY IN DEMANDING APPLICATIONS

(75) Inventor: Robert C. Hedtke, Young America, MN (US)

(73) Assignee: Rosemount Inc., Eden Prairie, MN (US)

( * ) Notice: Subject to any disclaimer, the term of this patent is extended or adjusted under 35 U.S.C. 154(b) by 87 days.

(21) Appl. No.: 10/738,451

(22) Filed: Dec. 16, 2003

(65) Prior Publication Data

US 2005/0126296 A1   Jun. 16, 2005

(51) Int. Cl.
  *F16J 3/00*   (2006.01)
(52) U.S. Cl. ......................................... 73/706; 277/317
(58) Field of Classification Search .................. 73/706, 73/707; 277/317
  See application file for complete search history.

(56) References Cited

U.S. PATENT DOCUMENTS

| 3,942,546 A | 3/1976 | Radd et al. ................... 137/93 |
|---|---|---|
| 5,257,542 A | 11/1993 | Voss ............................. 73/724 |
| 5,837,158 A | 11/1998 | Shepodd et al. ......... 252/181.6 |
| 6,063,307 A | 5/2000 | Shepodd et al. ......... 252/181.6 |
| 6,568,274 B1 | 5/2003 | Lucas et al. .................. 73/718 |

OTHER PUBLICATIONS

Heise HPO Precision Pressure Transducers and Transmitters, HEISE, 1997.
New HPO Precision Pressure Transducers, HEISE.
Copy of the German Patent and Trademark Office Office Action from application No. 10 2004 060 647.1 , filed Dec. 16, 2004.
Copy of the Chinese Patent and Trademark Office Office Action from application No. 200410081905.2, filed Dec. 16, 2003.

*Primary Examiner*—Andre J. Allen
(74) *Attorney, Agent, or Firm*—Westman, Champlin & Kelly, P.A.

(57) ABSTRACT

A remote process seal system is provided. The seal system includes at least one remote process seal assembly coupled to a process pressure transmitter via a coupling filled with an incompressible fluid. The incompressible fluid is contacted by at least one getter to reduce instabilities caused by the release of hydrogen gas accumulating over time. In one aspect, a layer of getter material is deposited or placed within the pressure transducing portion of the remote process seal assembly.

16 Claims, 4 Drawing Sheets

REMOTE PROCESS SEAL WITH IMPROVED STABILITY IN DEMANDING APPLICATIONS

FIELD OF THE INVENTION

The present invention relates to the process control and measurement industry. More particularly, the present invention relates to an improved remote process seal.

BACKGROUND OF THE INVENTION

The process control and measurement industry employs process variable transmitters to remotely monitor process variables associated with substances such as solids, slurries, liquids, vapors, and gasses in chemical, pulp, petroleum, pharmaceutical, food and other food processing plants. Process variables include pressure, temperature, flow, level, turbidity, density, concentration, chemical composition and other properties. A process variable transmitter can provide an output related to the sensed process variable over a process control loop to a control room, such that the process can be monitored and controlled.

The process control loop can be a two-wire, 4-20 mA process control loop. With such a process control loop, the energization levels are low enough that even under fault conditions the loop generally will not contain enough electrical energy to generate a spark. This is particularly advantageous in flammable environments. Process variable transmitters can sometimes operate on such low energy levels that they can receive all electrical power from the 4-20 mA loop. The process control loop can sometimes have digital signals superimposed on the two-wire loop according to a process industry standard protocol such as the HART® digital protocol.

Process pressure transmitters are used in a variety of applications to sense pressure (absolute, gage, or differential) within a process environment. Additionally, a process pressure transmitter can be used to sense differential pressure from two distinct points, such as at varying elevations along a tank and provide an indication of a fluid level within the tank. The measurement of pressures at two different spaced-apart locations in a process installation sometimes requires the use of one or more remote seals. Further, in some applications, the temperature of the process is so high that physically mounting the pressure transmitter near the process would destroy the pressure transmitter. Thus, remote seals are primarily used in applications where either the points at which the pressure is measured are spaced apart, or the temperature of the process itself is too high.

As used herein, a remote seal system consists of a pressure transmitter, at least one remote process seal assembly, a fluidic coupling between the remote process seal assembly and the pressure transmitter, and a fill fluid in the fluidic coupling. During operation, a thin, flexible diaphragm and fill fluid separate the pressure sensitive element of the pressure transmitter from the process fluid. The coupling, typically a capillary connects the remote process seal assembly to the pressure transmitter. When process pressure is applied, the diaphragm within the remote process seal assembly is displaced transferring the measured pressure through the fill system by way of the coupling to the pressure transmitter element. This transferred pressure displaces a sensing diaphragm in the pressure-sensitive element of the pressure transmitter. This displacement is proportional to the process pressure and is converted electronically to an appropriate current, voltage, or digital output signal such as HART® (Highway Addressable Remote Transducer).

In order to ensure that the pressure sensed within the pressure transmitter is an accurate representation of the process pressure, it is extremely important that the fill fluid be incompressible. While this may seem to be a relatively straight forward design criteria, it is known that certain types of oils will, over time, outgas or develop bubbles therein. Additionally, the metals that form the remote process seal assembly and/or the coupling may outgas, over time, to at least some extent. Currently, these issues are addressed by selecting very high quality fill fluids; pre-processing the fill fluid to decrease the extent to which it may outgas over time; and processing the metals that comprise the remote process seal assembly and/or the capillary tube to decrease the degree to which they outgas as well. Employing all of these techniques enhances the long-term stability of remote process seal systems.

Some applications (specifically the ones that expose the remote process seal assembly to high-temperature such as that over 200° C., and/or high-vacuum) can cause instabilities and/or inaccuracies in the remote process seal system. For example, in the above-noted demanding application, a remote process seal system manufactured according to all of the above-identified manufacturing techniques, may still experience gradually increasing inaccuracies or instabilities after operation of a period of six months or more. While this useful lifetime in the face of such a rigorous application has been acceptable, it would be much better to provide a remote process seal system that could withstand such demanding applications for a substantially longer time. Moreover, providing a remote process seal system that could not only withstand such demanding applications for an extended period of time, but also not require the additional processing steps that are currently provided to reduce or minimize the outgassing of the fill fluid and/or metal would represent a significant improvement to remote process seal systems.

SUMMARY OF THE INVENTION

A remote process seal system is provided. The seal system includes at least one remote process seal assembly coupled to a process pressure transmitter via a coupling filled with an incompressible fluid. The incompressible fluid is contacted by at least one getter to reduce instabilities caused by hydrogen gas accumulating over time. In one aspect, a layer of getter material is deposited or placed within the pressure transducing portion of the remote process seal assembly.

DETAILED DESCRIPTION OF THE PREFERRED EMBODIMENTS

In the past, remote process seal systems that were manufactured in accordance with the most rigorous standards still developed instabilities and/or inaccuracies over time. It has been theorized that this inaccuracy was due, in fact, to a gradual accumulation of hydrogen gas within the fill fluid. It was thought that the hydrogen was migrating out of the metal structures themselves in the remote process seal system when such system was operated in demanding applications. As used herein, a "demanding application" is intended to mean an operating condition wherein the temperature is above approximately 200° C., or the vacuum is below approximately 0.5 psia or both. According to the present inventions, a hydrogen getter material is placed within the fill fluid system of remote process seal assembly. The result is a more robust system for demanding applications.

Figure 1:
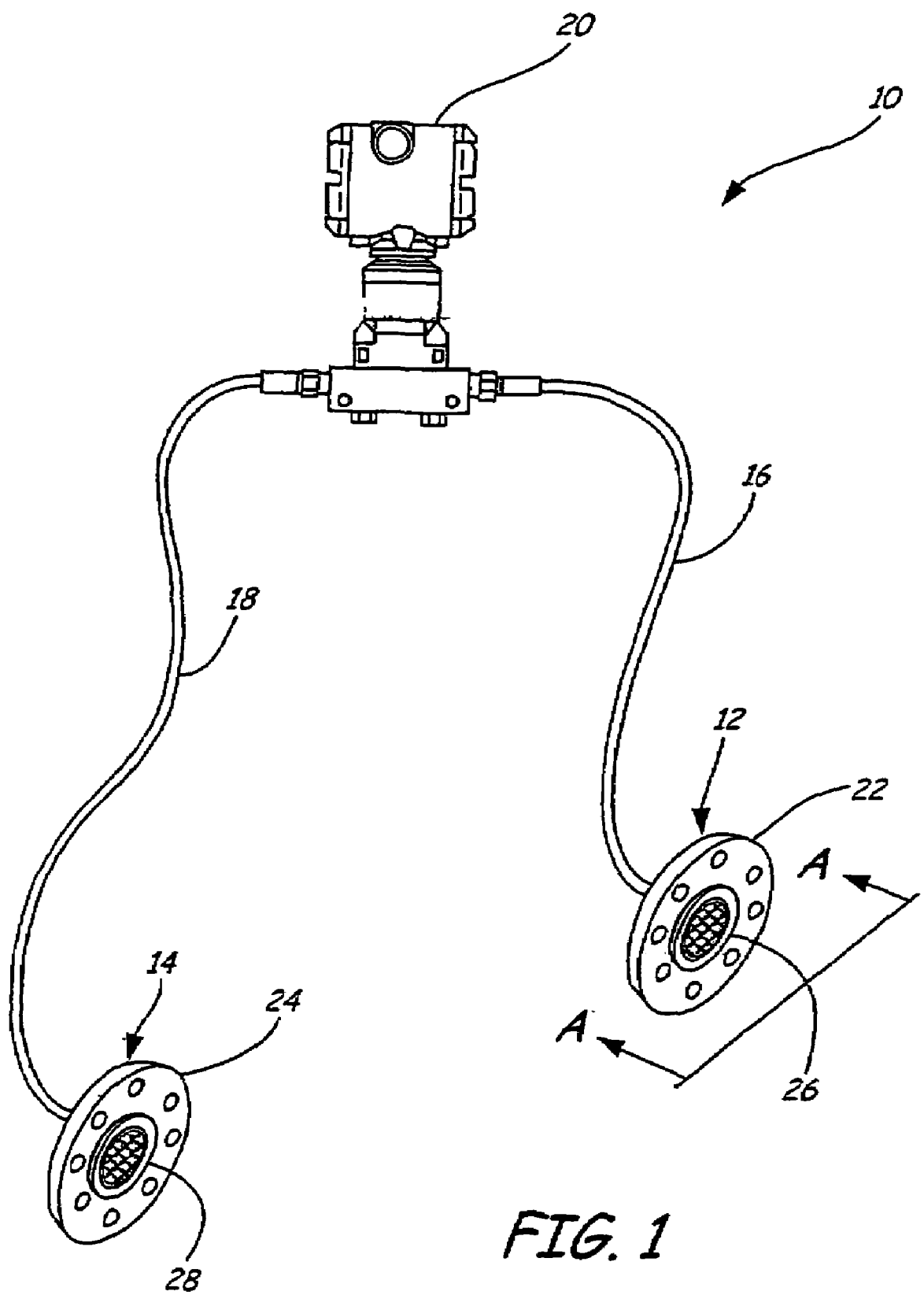
FIG. 1 is a diagrammatic view of a remote process seal system with which embodiments of the present invention are particularly useful.

FIG. 1 is a diagrammatic view of a remote process seal system with which embodiments of the present invention are particularly useful. System 10 includes a pair of remote process seal assemblies 12, 14 which are coupled, through respective capillaries 16, 18, to pressure transmitter 20. The particular configuration of the illustrated remote process seal assemblies 12 and 14 is purely for illustration since any remote process seal assembly whether currently known or developed in the future can be used with embodiments of the present invention. Remote process seal assemblies 12 and 14 each include a flange 22, 24, respectively, that preferably includes a bolt pattern suitable for mounting the remote process seal assembly in a process installation. Disposed within each of the mounting flanges is pressure transducing portion 26, 28. Pressure transducing portion 26, 28 is disposed to contact a process fluid and convey the pressure of the process fluid through the respective capillaries 16, 18, to process pressure transmitter 20.

Figure 2:
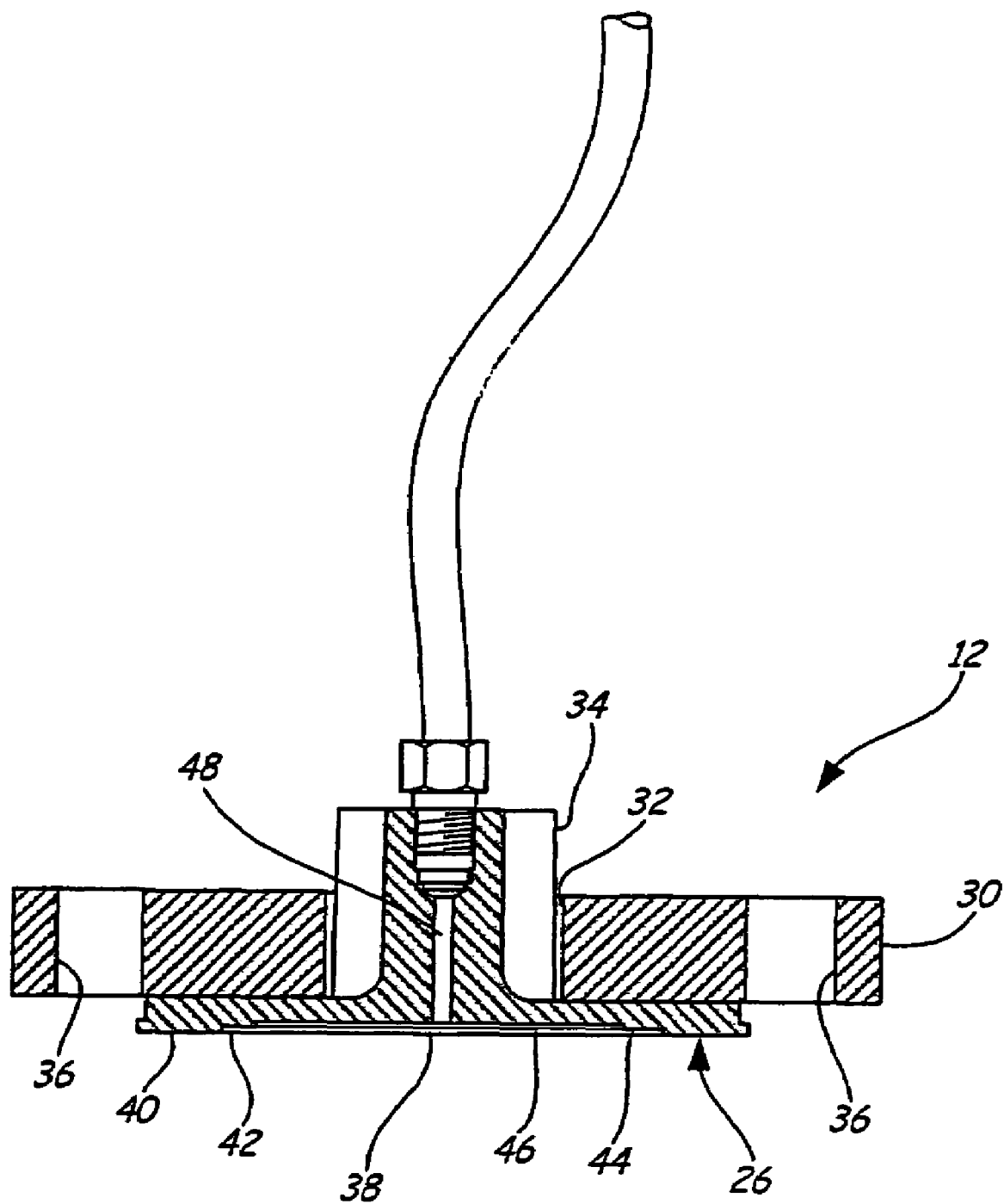
FIG. 2 is a cross sectional diagrammatic view of a remote process seal assembly in accordance with the prior art.

FIG. 2 is a diagrammatic cross section view of a remote process seal assembly taken along section lines A-A from FIG. 1. FIG. 2 illustrates remote process seal assembly 12 in accordance with the prior art. Remote process seal assembly 12 includes a mounting flange 30 that contains a through-hole 32 to pass shaft 34 of the pressure transducing portion 26. Disposed within mounting plate 30 are a number of mounting holes 36 for mounting to a suitable process connection. Pressure transducing region 26 is affixed to shaft 34 and disposed to contact a process fluid. This region 26 includes an isolator diaphragm 38 which is welded to plate member 40 at locations 42 and 44. Diaphragm 38 can be formed from a variety of materials depending on the application. Such materials include 316 stainless steal, 304 stainless steal, tantalum, zirconium, and any suitable alloys, such as Hastelloy® (registered trademark of Haynes International, Incorporated), Inconnel® 600 (registered trademark of Huntington Alloys Corporation), Monel® 400 (registered trademark of Inco Alloys International, Incorporated), or any other suitable materials. Typically, the surface of plate member 40 that faces the interior of diaphragm 38 is convoluted as illustrated at reference numeral 46. Plate member 40 is generally formed of similar materials, but may also include additional materials, such as carbon steel. The volume between the convoluted surface of plate member 40 and the interior surface of diaphragm 38 defines a chamber that is filled with an incompressible fill fluid such as silicone oil. However, a variety of other fill fluids can be used and embodiments of the present invention are useable with any suitable incompressible fluid. The fill fluid exists within passageway 48 and all the way up coupling 16 to the pressure transmitter (not shown in FIG. 2).

Figure 3:
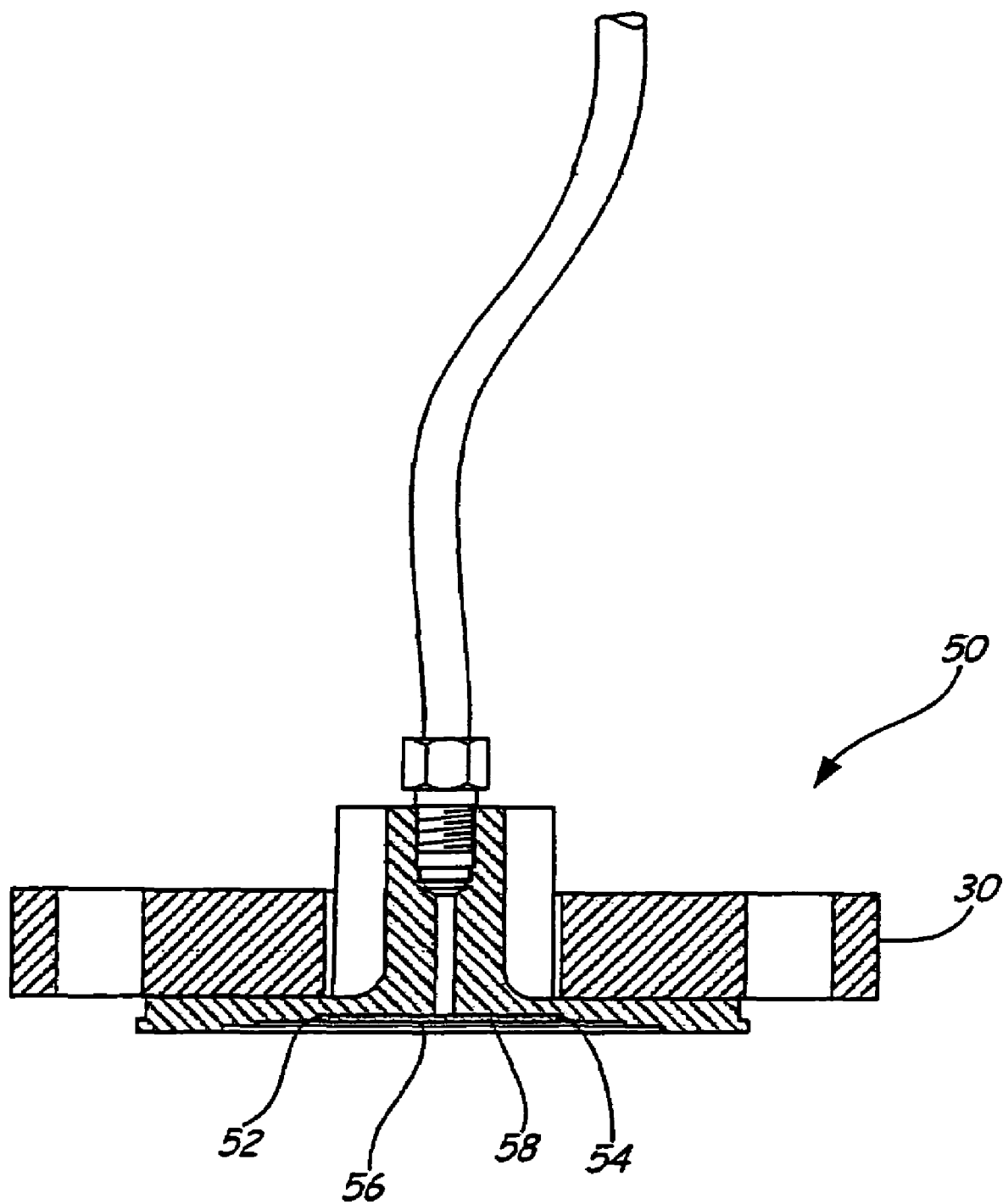
FIG. 3 is a cross sectional diagrammatic view of a remote process seal assembly in accordance with the embodiment of the present invention.
Figure 4:
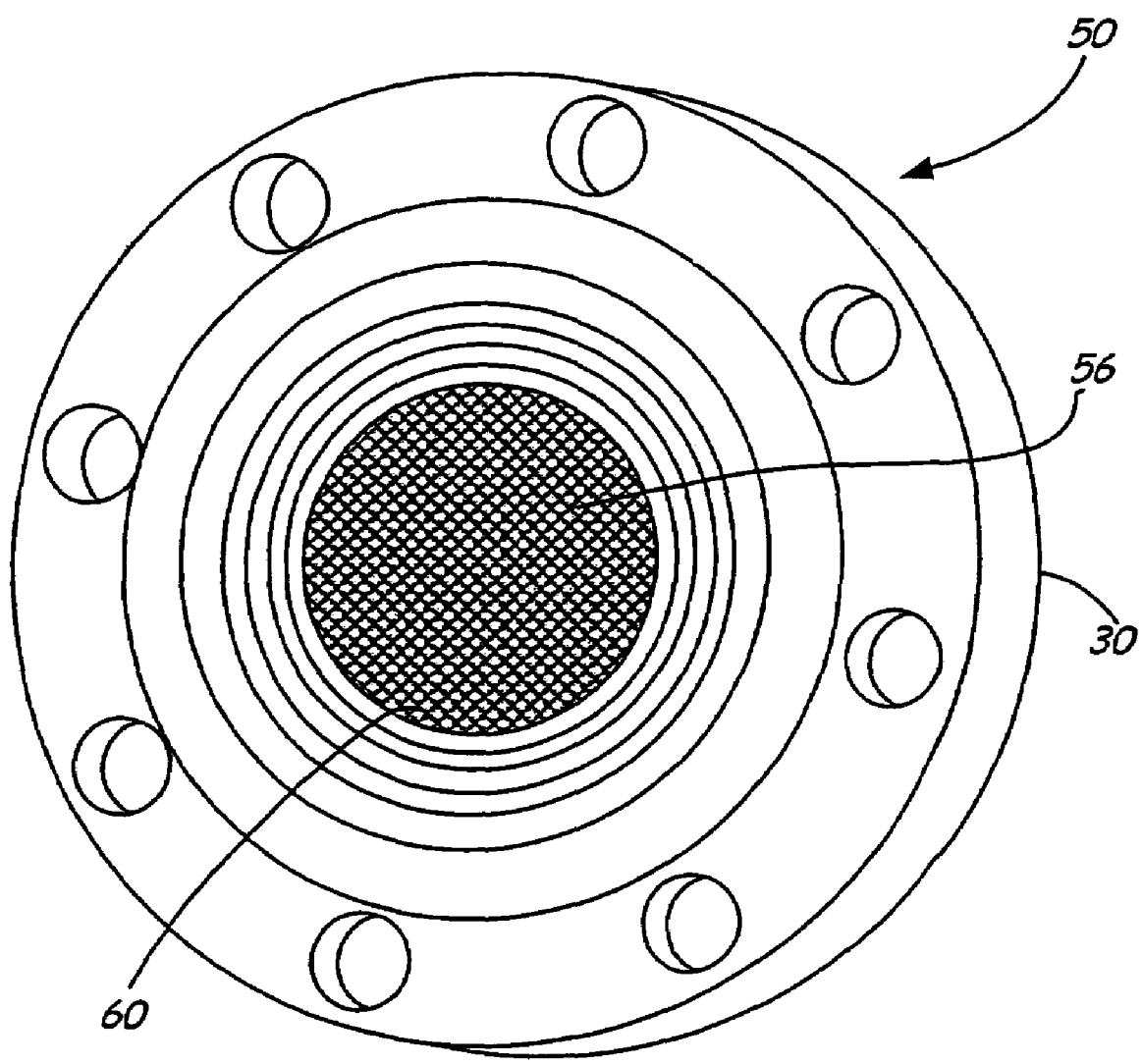
FIG. 4 is a perspective view of a remote process seal assembly in accordance with the embodiment of the present invention.

FIGS. 3 and 4 are cross sectional and perspective views, respectively, of a remote process seal assembly in accordance with an embodiment of the present invention. FIG. 3 illustrates remote process seal assembly 50 as resembling remote process seal 12 illustrated in FIG. 2, and like structures are numbered similarly. Specifically, remote process seal assembly 50 can use the same mounting flange 30 as illustrated in FIG. 2. The primary difference between improved remote process seal assembly 50 and assembly 12 is that assembly 50 includes an additional recess 52 within the fluid-filled chamber. This recess is preferably provided to accommodate the provision of a getter 54 and screen 56. FIG. 3 illustrates getter 54 having a hole 58 to allow fill fluid to pass therethrough. Disposed on top of getter 58, screen 56 is preferably a metallic screen that is welded into place. In embodiments where the getter does not include a hole 58, additional machining can provide a groove or additional recess to allow fill fluid to pass under the getter. As used herein, a getter is intended to mean any structure or substance that has the ability to immobilize, absorb, or otherwise remove gaseous hydrogen from the filled chamber.

FIG. 4 is a perspective view of improved remote process seal assembly 50 including flange 30. For the sake of illustration, the deflectable isolation diaphragm has been removed from assembly 50 to reveal not only that the convolutions thereunder, but also a relief channel 60 that passes under the screen and getter. Screen 56 is directly visible in FIG. 4 as cross hatching in the central portion of the seal assembly.

While embodiments of the present invention include the provision of any getter material within the fill fluid regions of a remote process seal system, it is preferred that the getter be in the form of a portion of sheet material that can be applied in the pressure-transuding portion of the remote process seal assembly. This is because the configuration of the getter as sheet material provides an increased surface area to facilitate the gettering action. Additionally, while embodiments of the present invention extend to any type of getter material within the filled volume of a remote process seal system, getters that can function with oils, such as silicon oil are preferred. Thus, while embodiments of the invention include the provision of getters such as platinum and/or palladium, these are not the preferred materials. The reason that traditional getter materials such as platinum or palladium are disfavored is because such materials were tested and found to become poisoned by fill fluid (which is typically oil). Instead, polymeric getters are preferred. Examples of known polymeric getters are disclosed in U.S. Pat. Nos. 5,837,158 and 6,063,307.

While it is known to use getters to maintain and/or develop high-vacuums in the past, such materials have not, heretofore, been used to maintain the pristine conditions within an oil-filled, non-vacuum remote process seal system. It is appreciated that the use of a hydrogen getter in a remote process seal systems will likely increase the viable lifetime of such systems when faced with demanding applications.

Although the present invention has been described with reference to preferred embodiments, workers skilled in the art will recognize that changes may be made in form and detail without departing from the spirit and scope of the invention. For example, while getter 54 was described with respect to FIG. 3 as being a layer of material applied within a recess of the process pressure sensing portion of the remote process seal, it is expressly contemplated that provision of a getter within the fill fluid chamber can include any suitable method and/or getters. For example, suitable getter material can be flashed or otherwise deposited upon the convoluted surface, or held in suspension in the fill fluid. Additionally, in embodiments where the getter is at least somewhat electrically inductive, and where the conductivity of the getter changes as a function of the hydrogen loading, it is expressly contemplated to measure the conductivity of the getter to provide an indication of getter loading and accordingly seal lifetime. Additionally, similar getter embodiments can be applied to any fill fluid system to enhance performance. For example, a pressure transmitter generally contains a fill fluid system and embodiments of the present invention could potentially provide similar benefits to enhance or maintain transmitter performance.

What is claimed is:

1. A remote process seal system comprising:
   a process pressure transmitter having at least one pressure inlet;
   a remote process seal assembly in fluid communication with the at least one pressure inlet of the process pressure transmitter, the remote process seal assembly being adapted to convey a process fluid pressure through a fill fluid to the at least one pressure inlet while isolating the process fluid from the at least one pressure inlet; and
   a getter disposed to contact fill fluid within the system.
2. The system of claim 1, wherein the getter is disposed in the remote process seal assembly.
3. The system of claim 2, wherein the getter is disposed proximate a pressure transducing portion of the remote process seal assembly.
4. The system of claim 2, wherein the getter is disposed within a recess in the remote process seal assembly.
5. The system of claim 4, and further comprising a screen mounted over the getter.
6. The system of claim 1, wherein the getter is a material flashed upon a surface of the remote process seal assembly.
7. The system of claim 5, wherein the screen is metallic.
8. The system of claim 1, wherein the getter is polymeric getter.
9. The system of claim 1, wherein the fill fluid is silicone oil.
10. The system of claim 1, wherein the remote seal assembly is constructed from stainless steal.
11. Wherein the system of claim 1, wherein the conductivity of the getter is measured and is a diagnostic indication of the product life of the remote seal assembly.
12. A method of maintaining a fill fluid in a process system, the method comprising:
   contacting the incompressible fill fluid with a getter to absorb hydrogen released into the incompressible fill fluid.
13. The method of claim 12, wherein the incompressible fill fluid is oil.
14. The method of claim 13, wherein the oil is a silicone oil.
15. The method of claim 12, wherein the fill fluid is disposed within a remote process seal system.
16. The method of claim 12, wherein the fill fluid is disposed within a pressure transmitter.

* * * * *